Patented Dec. 26, 1922.

1,439,961

UNITED STATES PATENT OFFICE.

CLIFTON B. JOHNSON, OF BEAVER, PENNSYLVANIA.

METHOD OF PREMELTING SCRAP FOR OPEN-HEARTH FURNACES.

No Drawing.   Application filed January 28, 1921. Serial No. 440,752.

*To all whom it may concern:*

Be it known that I, CLIFTON B. JOHNSON, a citizen of the United States, and a resident of Beaver, in the county of Beaver and State of Pennsylvania, have invented a new and useful Improvement in Methods of Premelting Scrap for Open-Hearth Furnaces, of which the following is a specification.

This invention relates to the making of steel by the open hearth process. More particularly the invention relates to the treatment of scrap steel or iron which is ordinarily added to the charge of metal that is to be refined and made into steel in an open hearth furnace. And more particularly still the invention comprises the pre-melting of the scrap before charging it into the open hearth furnace.

The objects of the invention are to furnish a method of charging open hearth furnaces which will result in a material saving of fuel and which will greatly increase the tonnage production of steel in a given furnace.

In the open hearth process of making steel the furnace is charged with a certain amount of iron. This is either in the form of pigs, or some other form of high carbon iron, and is ordinarily charged into the furnace either in the molten state, or else as solid iron. Usually this is melted first, and then the scrap which must be added to the base charge is introduced into the furnace. This is usually done by charging the scrap in a ladle or spoon-like container through an opening in the furnace, the container being inverted and the cold scrap poured in on top of the molten bath of iron.

Open hearth furnaces are heated by blowing upon the surface of the metal a blast formed by combustion of gas, liquid oil, powdered coal, or the like. Ordinarily the furnace is heated to a temperature of 2900° to 3100° F. during the refining period. In order to secure this high temperature it is necessary to supply fuel at a high rate, and theoretically combustion takes place immediately upon the entry of the fuel, the gases of combustion being constantly blown out by the incoming blast, the burning fuel being exposed to the incandescent metal for a very short period of time. The burning gas after passing over the metal and at the point of exit from the furnace is nearly as hot as it is in the middle of the furnace. Consequently, open hearth furnaces are extremely inefficient from the point of view of fuel consumption compared with the heat imparted to the metal thereby. Much more efficient forms of furnaces are known, and available for use for melting metal. By my method of melting scrap a temperature of only 2400° to 2700° F. will be sufficient for melting as the refining will be done in the open hearth furnace.

When the cold scrap is dumped into the open hearth it lowers the temperature of the molten basic charge and of the entire furnace and a large period of time is necessary thereafter for bringing the furnace after the addition of scrap up to the required temperature for refining. My invention consists in melting the scrap in a bath of molten metal before charging it into the open hearth furnace. This pre-melting may be done in any suitable form of supplementary container or furnace, which may be called a melter, and there are available for this purpose many furnaces which give a relatively high efficiency compared to the fuel consumption of an open hearth furnace. The particular form of furnace or melter used for pre-melting the scrap is not a part of my invention, and is therefore not illustrated and described.

In the practice of my invention I draw off from any suitable source, as for example a Bessemer converter, a charge of molten metal. This is to run into the movable melter, above referred to, until a sufficient quantity has been poured into it to form a bath. Then the solid scrap, in proper proportion, is dumped into this molten bath of low-carbon iron. The heat of the molten metal is sufficient to raise the scrap almost to the melting point, or possibly even to melting, dependent upon the relative temperatures and amounts of the two forms of material. The molten bath covering the solid scrap prevents its oxidation during the melting process, as well as assisting in melting it. Additional heat is added if required by means of a fuel blast upon the surface of the molten bath, and after the scrap has been melted the melter is tilted, pouring its contents into a ladle which is transferred to the open hearth and emptied thereinto.

The metal for forming this preliminary bath is preferably partially decarbonized, and may be referred to as a low-carbon iron, although this is not a part of the invention, and any molten metals suitable for charging into an open hearth may be used.

By this method, I am enabled to treat a charge in an open hearth furnace in several hours less time than that required by the present methods. In addition I am enabled to bring my charge of scrap to a molten state with a very much less expenditure of fuel than is necessary where the temperature of scrap is raised entirely in the open hearth furnace. Therefore, this process accomplishes the double object of increasing the tonnage production of open hearth furnaces by cutting down the time for producing the charge, and of reducing the amount of fuel required for treating a given charge.

Such additional heat as is necessary to melt the scrap after it has been placed in the molten bath is supplied by suitable blasts or other application of heat. For example, I may use a melter which is so made that a blast of air may be blown up through the molten charge, after the scrap is introduced. This air blast passing through the carbon, silicon, etc., in the molten iron produces a reaction similar to that in a Bessemer converter, and raises the heat in the molten bath sufficiently to melt the scrap. Furnaces having the necessary perforations for effecting this process are already well known and in use and therefore I do not claim or illustrate them herein.

The many uses and advantages of my invention will be apparent to those familiar with the art.

I claim:

1. In open hearth steel making, the method of melting scrap before charging it into the open hearth furnace, comprising the introduction of a charge of molten metal to a melter, the dumping of scrap into the molten bath, the heating of the mixture to the melting point of the whole, and the subsequent charging thereof into the open hearth furnace.

2. In open hearth steel making, the method of pre-melting the scrap before charging it to the open hearth furnace, comprising the dumping of the scrap into a bath of molten metal, and the blowing of air through the molten bath to raise the temperature of the molten metal to melt the scrap.

In testimony whereof, I have hereunto set my hand.

CLIFTON B. JOHNSON.

Witnesses:
HARRY ANDERSON,
DAVID STEWART.